United States Patent

[11] 3,554,563

| [72] | Inventors | Roger R. Schumacher;<br>William Olson, Birmingham, Mich. |
|---|---|---|
| [21] | Appl. No. | 766,575 |
| [22] | Filed | Oct. 10, 1968 |
| [45] | Patented | Jan. 12, 1971 |
| [73] | Assignee | Dynamic Seals, Incorporated<br>Roseville, Mich.<br>a corporation of Michigan |

[54] HYDRAULIC SEAL
16 Claims, 4 Drawing Figs.

| [52] | U.S. Cl. | 277/124 |
|---|---|---|
| [51] | Int. Cl. | F16j 15/00 |
| [50] | Field of Search | 277/205–<br>–211, 123—125 |

[56] References Cited
UNITED STATES PATENTS

| 2,264,147 | 11/1941 | Dunlevy | 277/205X |
|---|---|---|---|
| 2,318,486 | 5/1943 | Hoover | 277/124 |
| 3,167,323 | 1/1965 | Appleton et al. | 277/205 |

*Primary Examiner*—William F. O'Dea
*Assistant Examiner*—Robert J. Smith
*Attorney*—Barnard, McGlynn & Reising ABSTRACT: An annular hydraulic seal assembly including a base seal of polyurethane having a cross section with a planar bottom, a groove in the top and a sealing lip on either side of the groove. A loading seal has a projection extending downwardly for disposition in the groove of the base seal and has a V-shaped groove in the top thereof which terminates in a sealing lip on either side thereof. There is included a plurality of intermediate seals each having a generally V-shaped groove in the top thereof and a V-shaped bottom for coacting with one another and with one of the intermediate seals having its V-shaped bottom in the V-shaped groove of the loading seal. A terminal member having a V-shaped bottom and a flat planar top is included for engaging the topmost intermediate seal. The loading seal, intermediate seals, and terminal member are preferably made of an elastomer material filled or reinforced with a fabric. The polyurethane base seal is harder than the loading seal, intermediate seals, and terminal member.

PATENTED JAN 12 1971  3,554,563

INVENTORS
Roger R. Schumacher,
William Olson
BY
Barnard, McGlynn & Reising
ATTORNEYS

HYDRAULIC SEAL

Various machines utilize hydraulic actuators and the like. Typical of such an actuator is one including a piston movable in a cylinder as it is subjected to hydraulic pressure on each side thereof. Extending from one side of the piston and through the housing is a rod or plunger which is attached to a member to be controlled. A seal surrounds the rod and coacts with the housing for preventing hydraulic fluid from leaking out of the housing.

It has proven very difficult, if not impossible, to provide a hydraulic seal which performs a satisfactory sealing function when used with various assemblies and under various operating conditions. Most pertinent to the instant invention are two basic prior art seals. One seal is of the type made solely of polyurethane. The other type seal is one made of a softer elastomer material frequently reinforced with fabric such as neoprene reinforced with fabric. A polyurethane seal is hard and strong and abrasive resistant and performs an excellent sealing function when utilized with a smooth movable element. A polyurethane seal, however, cannot be used satisfactorily with a moving element having a rough finish because, although polyurethane is very abrasive resistant, a rough element has a tendency to chip the polyurethane as by causing a cut which in turn grows and leads to chipping away of the polyurethane. A neoprene seal reinforced with fabric, however, provides a satisfactory seal when utilized with a moving element having a rough surface. A polyurethane seal provides a very satisfactory seal until it reaches a certain operating temperature at which point it deteriorates. Furthermore, a polyurethane seal when exposed to cold or lower temperatures shrinks so that the outer diameter of an annular seal shrinks to allow leakage thereby. The seal of neoprene reinforced with fabric, on the other hand, can withstand temperatures higher than the temperatures at which the polyurethane deteriorates and does not present the shrinkage problem as does a polyurethane seal when exposed to cold temperatures. A polyurethane seal is very effective at low pressures whereas the neoprene impregnated with fabric is not as effective at low pressures. Generally speaking, the prior art seals may be designed for high pressures but do not adequately seat at low pressures, thus resulting in leakage during nonoperation or very low pressure operation. There has been utilized in the prior art a polyurethane seal having a recess in the top thereof so that the portions on each side of the recess are flexible as hydraulic pressure enters the recess. Such seals have not proven entirely satisfactory, however, since during a long down time the portions of the seal on either side of the recess tend to collapse and move away from sealing engagement with the relatively moving parts.

Accordingly, it is an object and feature of this invention to provide a hydraulic seal assembly of the type to be utilized between two relatively moving members and including a base seal of organic polymeric material and a loading seal of a different organic polymeric material with the two seals having a unique structure for coacting engagement with one another thereby providing a seal assembly effective in a variety of environments and over a wide range of operating conditions.

In correlation with the foregoing object and feature, it is another object and feature of this invention to provide a seal assembly where the base seal includes lip means for sealing engagement with the relatively moving members and the loading seal includes lip means for sealing engagement with the relatively moving members.

In correlation with the foregoing objects and features, it is another object and feature of this invention to provide a seal assembly wherein the base seal has a groove therein and the loading seal has a projection for disposition in the groove to maintain the lips of the base seal in sealing engagement with the relatively moving members.

In correlation with the foregoing objects and features, it is another object and feature of this invention to provide a seal assembly wherein the base seal is of polyurethane and the loading seal is of a softer elastomer material.

Another object and feature of this invention is to provide a hydraulic seal assembly which may be utilized with various different components having different degrees of smoothness and which will seal under various operating pressures and temperatures and which will effectively seal after long inoperative periods.

Other objects and attendant advantages of the present invention will be readily appreciated as the same becomes better understood by reference to the following detailed description when considered in connection with the accompanying drawings wherein.

Figure 1:
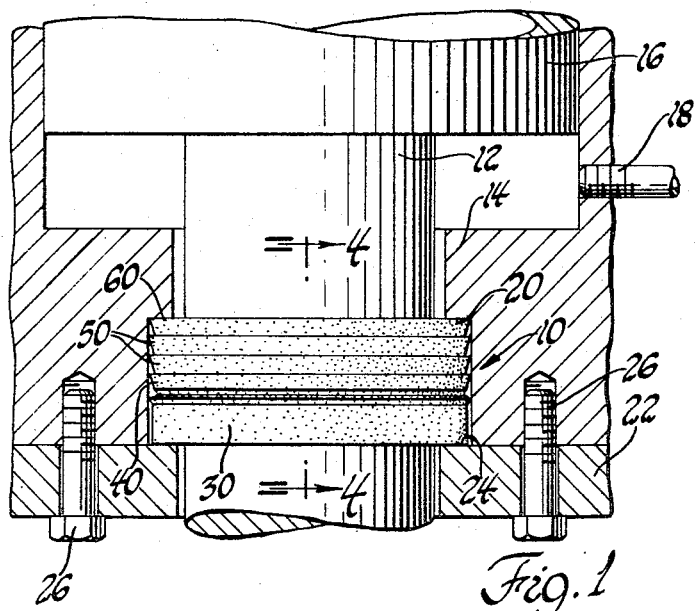
FIG. 1 is a fragmentary cross-sectional view disclosing a preferred embodiment of the hydraulic seal assembly of the instant invention in operative sealing engagement between two relatively moving members.

Referring now to the drawings, wherein like numerals indicate like or corresponding parts throughout the several views, there is generally shown at 10 a preferred embodiment of the annular hydraulic seal assembly of the instant invention. The seal assembly 10 is to be utilized between two relatively moving members such as the rod 12 and the housing 14. The rod 12 is attached to a hydraulic piston 16. The piston 16 is selectively and alternatively supplied hydraulic fluid pressure on each side thereof to move back and forth within the housing 14, one hydraulic line being shown at 18. The housing 14 provides a gland or shoulder 20 and a cover plate 22 provides a second gland or shoulder 24. The seal assembly 10 is disposed between the glands 20 and 24. The cap 22 is secured to the housing 14 by the bolts 26.

There is included a base seal 30. The base seal 30 is made of the organic polymeric material polyurethane having a durometer between 45 and 55 on the Shore D scale. The base seal 30 is, therefore, relatively hard.

Figure 2:
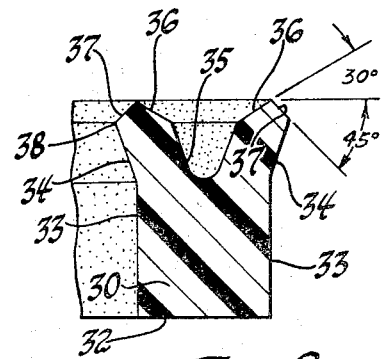
FIG. 2 is an enlarged cross-sectional view of the base seal of the assembly.
Figure 3:
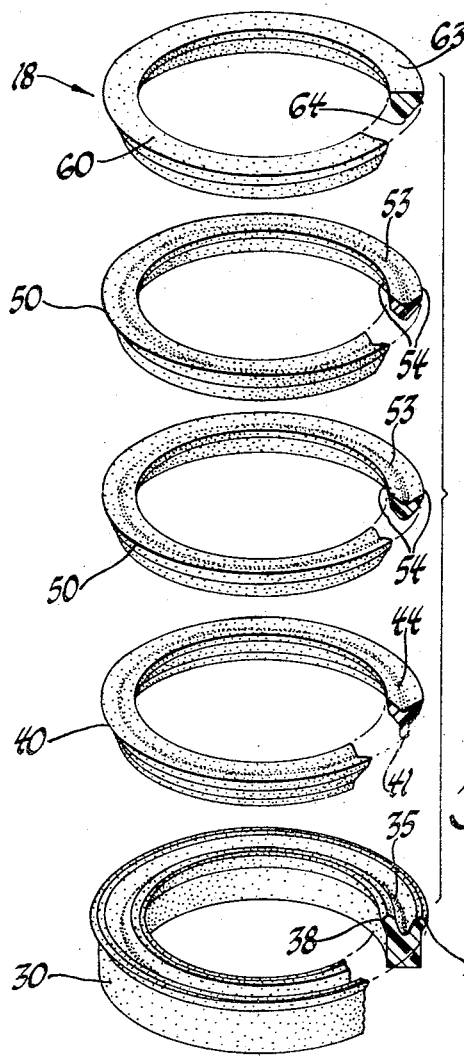
FIG. 3 is an exploded view showing the various components of the assembly.

As best illustrated in FIG. 2, the base seal 30, when in the noninstalled condition, has a cross section including a planar bottom 32 and a pair of spaced parallel planar sides 33 extending upwardly therefrom. A tapered wall 34 extends outwardly and upwardly at the upper extremity of each of the sides 33. A substantially V-shaped groove 35 having an arcuate bottom is disposed in the upper extremity or top of the base seal 30. A seating surface 36 extends upwardly and outwardly at an angle of 30° relative to the bottom 32 from each side of the V-shaped groove 35. In other words, the seating surfaces 36 are disposed at an angle at 30° relative to the horizontal but for ease of description is denoted as being at an angle of 30° relative to the planar bottom 32. Thus, the seating surfaces 36 are disposed at an angle of 120° relative to one another. A pressure surface 37 interconnects each seating surface 36 and the adjacent tapered wall 34. Each pressure surface 37 is disposed at an angle of 45° relative to the bottom 32. Thus, the pressure surfaces are disposed at an angle of 270° relative to one another. The intersection of the pressure surfaces 37 and the tapered walls 34 define sealing lips 38 on either side of the groove 35 for engaging the relatively moving members 12 and 14.

The assembly also includes an annular loading seal 40. The loading seal 40 is of an organic polymeric material softer than the material of which the base seal 30 is made. Preferably, the loading seal 40 is made of an elastomeric material reinforced with a fabric as for example neoprene. The elastomeric material of the loading seal 40 as well as the remaining components to be described preferably has a durometer between 70 and 90 on the Shore A scale.

Figure 4:
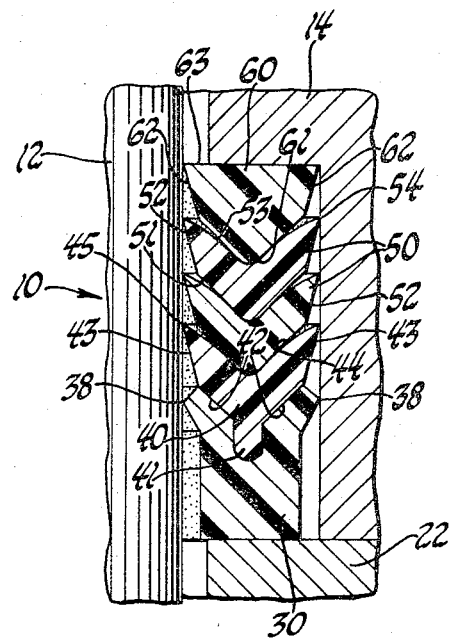
FIG. 4 is an enlarged fragmentary cross section cross-sectional view taken substantially along line 4—4 of FIG. 1.

The loading seal 40 has a cross section including a downwardly extending generally U-shaped projection 41 for disposition in the groove 35 of the base seal 30 as illustrated in FIG. 4. A seating wall 42 extends upwardly and outwardly from the upper extremity of each side of said U-shaped projection 41 for engaging the seating surfaces 36 of the base seal 30. A lip wall 43 extends upwardly and outwardly from the upper extremity of each seating wall 42. The lip walls 43 extend more upwardly than outwardly as compared to the seating walls 42. A generally V-shaped groove 44 extends into the top portion of the loading seal 40 and interconnects the lip walls 43. Thus, the lip walls 43 intersect the V-shaped groove 44 to define the sealing lips 45.

The assembly also includes a plurality of intermediate seals 50 which are preferably made of the same material as the loading seal 40. Each intermediate seal 50 has a cross section including a V-shaped bottom for coacting with another intermediate seal or the V-shaped groove 44 in the loading seal 40. A lip wall 52 extends upwardly and outwardly from each side of the V-shaped bottom 51. The lip walls 50 extend more upwardly than outwardly as compared to the V-shaped bottom 51. A generally V-shaped groove extends into the top of each intermediate seal and interconnects the lip walls 52 thereof. The lip walls 52 intersect the V-shaped groove 53 to define sealing lips 54.

The assembly also includes a terminal member or ring 60 which is also preferably made of the same material as the loading seal 30. The terminal ring 60 has a cross section including a V-shaped bottom 61 for coacting with a V-shaped groove 53 in one of the intermediate seals 50. A lip wall 62 extends upwardly and outwardly from each side of the V-shaped bottom 61. The lip wall 62 extends more upwardly than outwardly as compared to the V-shaped bottom 61. A flat planar surface 63 extends between the lip walls 62.

As alluded to above, the base seal 30 has the cross-sectional configuration as illustrated in FIG. 2 when in the noninstalled condition. In order to utilize this seal the various components are assembled together and disposed between two glands such as 20 and 24 as illustrated in FIG. 1. When so installed, the sealing lips 38 of the base seal 30 move toward one another to the position illustrated in FIG. 4. One or more intermediate seals 50 may be utilized depending upon the space between the glands 20 and 24. The space may be such that there is a slight mechanical force urging the components together which in turn maintains the loading seal 40 in the position illustrated in FIG. 4 with the projection 41 thereof disposed in the groove 35 which has taken on a U-shaped configuration as illustrated in FIG. 4; such prevents the lips 38 from moving toward one another or collapsing during long periods of nonuse or inoperation. During operation, hydraulic fluid acts upon the surfaces of the V-shaped grooves of the loading seal 30 and the intermediate seals 50 to force the sealing lips thereof into engagement with the relatively moving parts. In addition, the hydraulic pressure moving past the lips 45 of the loading seal 40 engages the pressure surfaces 37 of the base seal 30 to force the lips 38 thereof into sealing engagement with the relatively moving members 12 and 14. The pressure surfaces 37 are angulated as such because it is desirable to obtain a force acting thereon of a lesser magnitude than the resulting force acting on the lips of the other members to effect the most efficient seal.

One of the most important advantages of the seal assembly of the instant invention is the increased safety factor resulting from its use. There are many pieces of equipment, such as fire fighting equipment and machines utilized in construction, which utilize hydraulic actuators requiring seals. The seals heretofore utilized normally malfunction very abruptly and without warning when subjected to incompatible operating conditions. This, of course, creates a very hazardous situation. The instant seal, however, may be subjected to various operating conditions, one of which may cause the failure of either the base seal 30 or one or more of the loading seals and intermediate seals, however, the opposite will maintain a safe sealing condition until the machine can be rendered inoperative for repair.

The invention has been described in an illustrative manner and it is to be understood that the terminology which has been used is intended to be in the nature of words of description rather than of limitation.

For example, the seals herein have been described in terms of tops, bottoms, sides, etc., but it will be understood that this is merely for ease of description in that the orientation of the sealing components may be changed so that the tops and bottoms are reversed.

Obviously, many modifications and variations of the present invention are possible in light of the above teachings. It is, therefore, to be understood that within the scope of the appended claims, the invention may be practiced otherwise than as specifically described.

We claim:

1. An annular hydraulic seal assembly of the type to be utilized between two relatively movable members, said assembly comprising: a base seal having a cross section with a planar bottom, a pair of spaced parallel planar sides extending upwardly from said bottom, a tapered wall extending outwardly and upwardly from the upper extremity of each of said sides, a groove in the top thereof, a seating surface extending upwardly and outwardly from each side of said groove to define with said tapered walls and a sealing lip on either side of said groove for engaging the relatively moving members, a pressure surface interconnecting each seating surface and the adjacent tapered wall, each of said pressure surfaces extending inwardly and upwardly from the adjacent tapered wall; and a loading seal having a projection extending downwardly therefrom for disposition in said groove of said base seal and having a cross section including a seating wall extending upwardly and outwardly from the upper extremity of each side of said projections projection for engaging said seating surfaces of said base seal to define a sealing lip on either side of said projection for engaging the relatively moving members.

2. An assembly as set forth in claim 1 wherein said base seal is of polyurethane.

3. An assembly as set forth in claim 2 wherein said loading seal is of an elastomer reinforced with a fabric.

4. An assembly as set forth in claim 2 wherein said loading seal is of an elastomer reinforced with a fabric.

5. An assembly as set forth in claim 4 wherein said polyurethane has durometer between 45 and 55 on the Shore D scale.

6. An assembly as set forth in claim 5 wherein said elastomer has a durometer between 70 and 90 on the Shore A scale.

7. An assembly as set forth in claim 1 wherein said cross section of said loading seal includes a lip wall extending upwardly and outwardly from the upper extremity of each of said seating walls, said lip walls respectively extending more upwardly than outwardly as compared to said seating walls.

8. An assembly as set forth in claim 7 wherein said base seal is made of an organic polymeric material which is harder than the material of which said loading seal is made.

9. An assembly as set forth in claim 8 wherein said base seal is of polyurethane.

10. An assembly as set forth in claim 8 wherein said loading seal has a generally V-shaped groove therein opposite to said projection, and including an additional member having a generally V-shaped bottom for disposition in said V-shaped groove of said loading seal.

11. An assembly as set forth in claim 10 wherein said additional member is a terminal member having a flat planar top.

12. An assembly as set forth in claim 10 wherein said additional member is an intermediate seal having a generally V-shaped groove in the top thereof for receiving another member having a V-shaped bottom.

13. An assembly as set forth in claim 12 including a plurality of said intermediate seals for coacting together by disposition of the V-shaped bottom of one into the V-shaped groove of another and said another member is a terminal member having a flat planar top.

14. An assembly as set forth in claim 13 wherein said intermediate seals and said terminal member each have a cross section including lip walls extending upwardly and outwardly from the upper extremities of the V-shaped bottoms thereof.

15. An assembly as set forth in claim 14 wherein the V-shaped groove and the lip walls of each intermediate seal intersect to define lip seals.

16. An annular hydraulic seal assembly of the type to be utilized between two relatively moving members, said assembly comprising: a base seal made of polyurethane; said base seal having a durometer between 45 and 55 on the Shore D scale; said base seal having a cross section including a planar bottom, a pair of spaced parallel planar sides extending upwardly from said bottom, a tapered wall extending outwardly and upwardly at the upper extremity of each of said sides, a substantially V-shaped groove disposed in the upper extremity thereof, a seating surface extending upwardly and outwardly at an angle of 30° relative to said bottom from each side of said V-shaped groove, said seating surfaces being disposed at an angle of 120° relative to one another, a pressure surface interconnecting each seating surface and the adjacent tapered wall and disposed at an angle of 45° relative to said bottom, said pressure surfaces being disposed at an angle of 270° relative to one another; a loading seal made of an elastomeric material reinforced with a fabric; said elastomeric material having a durometer between 70 and 90 on the Shore A scale; said loading seal having a cross section including a downwardly extending generally U-shaped projection for disposition in said groove of said base seal, a seating wall extending upwardly and outwardly from the upper extremity of each side of said U-shaped projection for engaging said seating surfaces of said base seal, a lip wall extending upwardly and outwardly from the upper extremity of each of said seating walls, said lip walls extending more upwardly than outwardly as compared to said seating walls, a generally V-shaped groove extending thereinto and interconnecting said lip walls, each of said lip walls intersect said V-shaped groove to define a sealing lip; at least one intermediate seal made of an elastomeric material reinforced with a fabric with the elastomeric material thereof having a durometer between 70 and 90 on the Shore A scale; said intermediate seal having a cross section including a V-shaped bottom for coacting with said V-shaped groove in said loading seal, a lip wall extending upwardly and outwardly from each side of said V-shaped bottom, said lip walls extending more upwardly than outwardly as compared to said V-shaped bottom, a generally V-shaped groove extending thereinto and interconnecting said lip walls thereof, each of said lip walls intersect said V-shaped groove to define a sealing lip; a terminal ring of elastomeric material reinforced by fabfi fabric with the elastomeric material thereof having a durometer of between 70 and 90 on the Shore A scale; said terminal ring having a cross section including a V-shaped bottom for coacting with said V-shaped groove of said intermediate seal, a lip wall extending upwardly and outwardly from each side of said V-shaped bottom, said lip walls extending more upwardly than outwardly as compared to said V-shaped bottom, a flat planar surface extending between said lip walls.